S. R. RUTH & A. B. WENGER.
Railway Cattle-Guards.
No. 154,521.  Patented Aug. 25, 1874.
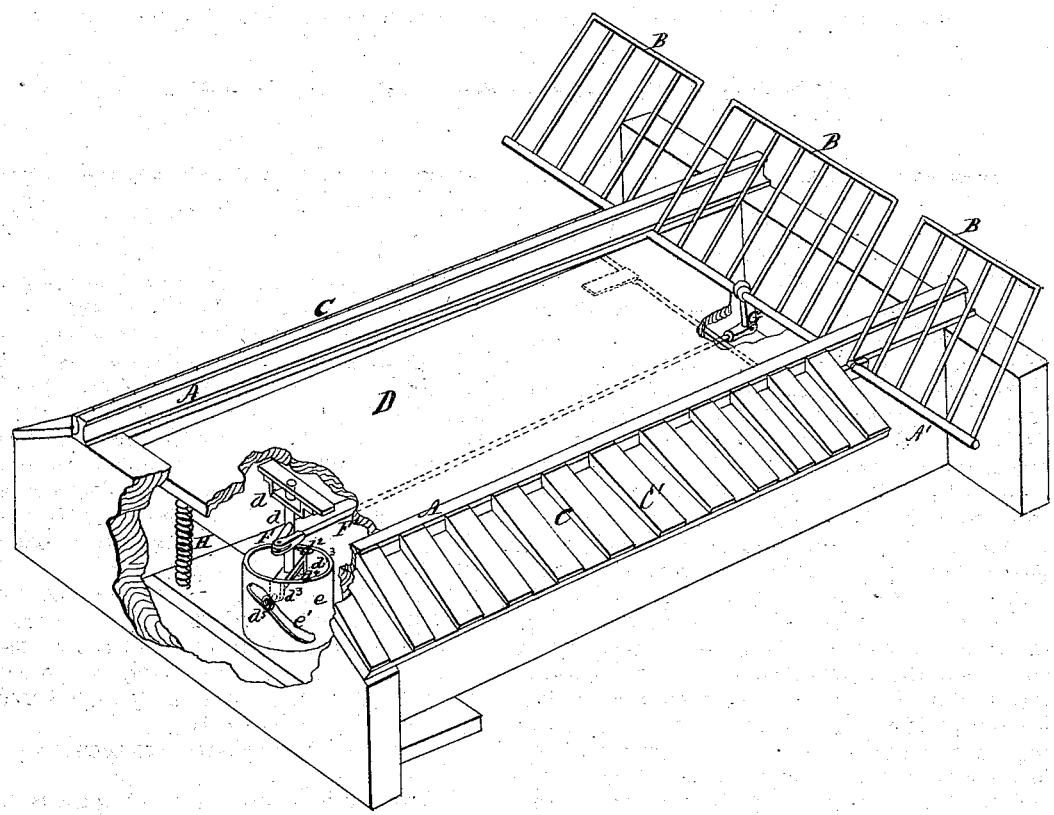

UNITED STATES PATENT OFFICE.

SAMUEL R. RUTH AND AMBROSE B. WENGER, OF AKRON, PA.

IMPROVEMENT IN RAILWAY CATTLE-GUARDS.

Specification forming part of Letters Patent No. 154,521, dated August 25, 1874; application filed July 21, 1874.

*To all whom it may concern:*

Be it known that we, SAMUEL R. RUTH and AMBROSE B. WENGER, of Akron, in the county of Lancaster and State of Pennsylvania, have invented certain new and useful Improvements in Railroad Cattle-Gates; and we do hereby declare the following to be a full, clear, and exact description of the invention, such as will enable others skilled in the art to which it pertains to make and use it, reference being had to the accompanying drawings, which form part of this specification, in which is shown a perspective view of our invention.

This invention has relation to railroad-gates for preventing the passage of cattle; and it consists in the novel construction and arrangement of devices used in combination with a hinged platform and a pivoted rising and falling gate or guard, and so operating that the latter will rise to guard the track when the weight of an animal crossing the road is imposed on the platform, and afterward fall automatically.

Referring to the accompanying drawings, A A designate a section of railroad-track, across which, preferably at the junction of carriage-road, is placed a suitable gate or guard, B, pivoted below the rails, and constructed in sections, so as to operate beyond as well as between the rails. C designates side guards formed of inclines having transverse slots $C'$, as shown, and designed to prevent cattle from passing the gates at the sides of the rails. D represents the hinged platform located between the rails and behind the gate. This platform is depressible at its rear end, to which is attached a vertical revolving shaft, $d$, journaled to a box, $d^1$, and holding at its lower end a horizontal bar, $d^2$, with ears $d^3$, supporting a horizontal shaft, $d^4$. The bar $d^2$ and shaft are inclosed within a cylinder, $e$, having scroll-slots $e'$ in its sides, through which pass the ends of the shaft $d^4$, provided with rollers $d^5$, which travel through the slots. By this arrangement of parts the shaft $d$ is caused to turn in its bearing according as the platform is lowered or raised. F is an arm projecting laterally from the shaft $d$, and connected, by means of a rod, $F'$, to an arm or crank, G, depending from the shaft $A'$ of the gate.

When the platform is depressed by superincumbent weight, and the rod $d$ turned, the motion transmitted through the rod $F'$ causes the gate to rise. When the weight is removed the platform is raised and the gate lowered by the force of the springs H.

I claim as new and desire to secure by Letters Patent—

1. The combination, with the gate B, turning upon a horizontal axis, of the crank G, connecting-rod $F'$, vertical rotary shaft $d$, supporting horizontal shaft $d^4$, vertical cylinder $e$, having spiral slots $e'$, and depressible platform D, substantially as shown and described.

2. The combination, with a railroad-gate, of the side guards, inclining downward from the outer sides of the rails, and transversely slatted or ribbed, as shown.

In testimony that we claim the foregoing we have hereunto set our hands this 11th day of July, 1874.

SAMUEL R. RUTH.
AMBROSE B. WENGER.

Witnesses:
GEO. A. KEMPER,
JAMES G. ROOT.